Sept. 20, 1932.  R. C. SPAULDING ET AL  1,878,340
WELDING APPARATUS
Filed March 16, 1931
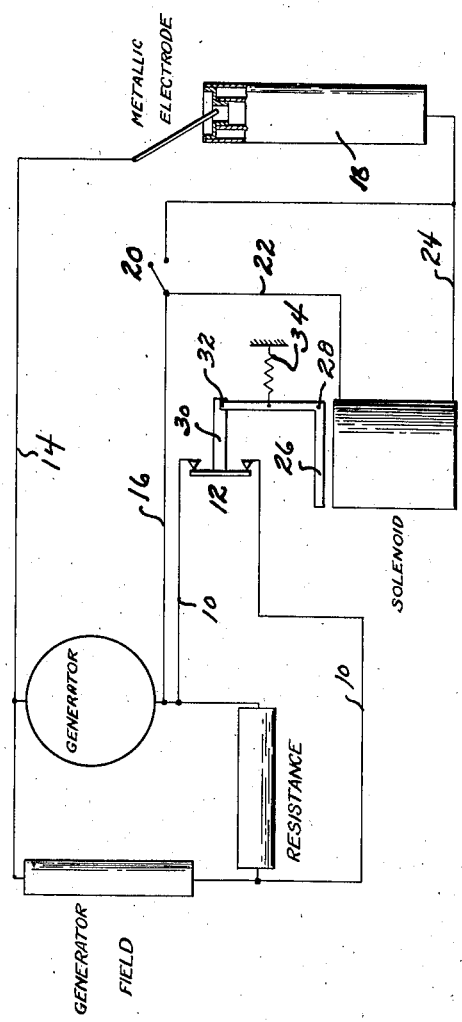
Roy C. Spaulding
Arthur C. Born
Virgil Oldberg
INVENTORS
BY
Francis D. Hardesty.
ATTORNEY Patented Sept. 20, 1932

1,878,340

UNITED STATES PATENT OFFICE

ROY C. SPAULDING, VIRGIL OLDBERG, AND ARTHUR C. BORN, OF DETROIT, MICHIGAN, ASSIGNORS TO OLDBERG MANUFACTURING COMPANY, OF DETROIT, MICHIGAN, A CORPORATION OF MICHIGAN

WELDING APPARATUS

Application filed March 16, 1931. Serial No. 522,886.

This invention relates to welding apparatus and more particularly to apparatus which has been found useful in metallic arc spot welding.

An object of this invention is an apparatus which will automatically reduce the voltage in the electrode supply circuit at properly timed intervals or at a predetermined number of seconds following the establishing of the arc from the electrode.

A further object is a welding apparatus of the class above described wherein the generator field strength is automatically reduced at predetermined intervals or at a predetermined number of seconds folowing the establishing of an arc from an electrode.

Still further objects are novel welding apparatus disclosed and described hereafter.

Fig. 1 shows diagrammatically an embodiment of the invention.

Fig. 2 is a partial diagrammatic view of a second embodiment.

Referring to the drawing it will be seen that the welding apparatus includes a generator having a self excited field coil in series with a resistance coil. A shunt circuit 10 controlled by a switch 12 is connected to the resistance coil so as to shunt the latter when the switch is closed and to permit the resistance affecting the flow of current thru the generator field coil when the switch 12 is opened.

Generator lines 14 and 16 are connected to the metallic electrode and to the article which is to be welded, namely, the muffler 18, there being a control switch 20 in the line 16 for obvious reasons. Shunting the switch 20 is a solenoid connected to the circuit line 16 by lines 22 and 24, and the solenoid is for the purpose of opening the switch 12, the solenoid armature 26 being in the form of a bell crank pivoted at 28 and connected to the switch operator 30 by means of the pivot connection 32, there being a switch closing means such as the coil spring 34.

The operation of the device will readily be observed from the foregoing. When an arc is established from the electrode the solenoid is energized and the switch 12 is automatically opened, thereby cutting out the shunt around the resistance coil and reducing the generator field strength. The generator voltage then drops to such a point that the arc from the electrode will no longer be maintained. At the same time the dropping of the voltage will cause the solenoid to be de-energized and the return spring 34 will close the switch 12, shunting the resistance and re-establishing the field strength. When the field strength is thus reestablished, the voltage will be increased and an arc will again be established. The sequence will repeat itself automatically at regular intervals.

It is often desired to close the switch 12 at properly timed intervals rather than haphazardly, as done by the coil spring 34. For this purpose a timed return device diagrammatically shown in Fig. 2 is connected to the vertical portion of the armature 26 to close the switch 12 at properly timed intervals. Any suitable timed return device may be used, and since such devices are well known, they are not here illustrated.

While the resistance control is shown as including a shunt circuit, it is obvious that a resistance control including a variable resistance may be employed in the combination without departing from the spirit of the invention.

Further, a thermal circuit breaker may be used in place of the electromagnetic solenoid circuit breaker, if desired, tho the solenoid has proven more desirable in the combination.

While reference has been made to the establishing of an arc from an electrode, it will be understood that the arc may be established between an electrode and the work, or between two similar, or even dissimilar, electrodes, the welding being of the metallic arc process, of the carbon arc process, or of the carbon arc torch process.

Further, while generator lines 14 and 16 are shown as connected to the metallic electrode and to the work, it will be understood that they may be connected to two electrodes, as described above.

Further, while a self excited field has been shown it will be understood that a separately excited field may be used. Further, the field coil may be in series with the resistance coil, in case a shunt or separately excited generator is used, or it may be in parallel with the resistance, in case a series or compound generator is used.

Now having described the invention and the preferred embodiment thereof, it is to be understood that the said invention is to be limited, not to the specific details herein set forth, but only by the scope of the claims which follow:

What we claim is:

1. Welding apparatus including a generator, a field coil operatively connected to the latter, a resistance in series with said field coil, a circuit shunting the resistance, a switch in the shunt circuit, a welding electrode connected to one line of the generator, an article to be welded connected to the other line of the generator, an electrically operating shunt switch opening device in one of the generator lines, and shunt switch closing means, the device including a solenoid in series with the generator line, the armature of the solenoid being mechanically connected to the switch so that as the solenoid is energized, the armature is moved to open the switch.

2. Welding apparatus including a generator, a field coil operatively connected to the latter, a resistance in series with said field coil, a circuit shunting the resistance, a switch in the shunt circuit, a welding electrode connected to one line of the generator, an article to be welded connected to the other line of the generator, an electrically operating shunt switch opening device in one of the generator lines, and shunt switch closing means, the device including a solenoid in series with the generator line, the armature of the solenoid being mechanically connected to the switch so that as the solenoid is energized, the armature is moved to open the switch, and thereby reduce the field strength to reduce the generator voltage.

3. Welding apparatus including a generator, a field coil operatively connected to the latter, a resistance in series with said field coil, a circuit shunting the resistance, a switch in the shunt circuit, a welding electrode connected to one line of the generator, an article to be welded connected to the other lines of the generator, an electrically operating shunt switch opening device in one of the generator lines, and shunt switch closing means, the device including a solenoid in series with the generator line, the armature of the solenoid being mechanically connected to the switch so that as the solenoid is energized, the armature is moved to open the switch and thereby reduce the field strength to reduce the generator voltage, and deenergize the solenoid.

In testimony whereof, we sign this specification.

ROY C. SPAULDING.
VIRGIL OLDBERG.
ARTHUR C. BORN.